(12) United States Patent
Korczak

(10) Patent No.: US 8,011,621 B2
(45) Date of Patent: Sep. 6, 2011

(54) SNAP-IN CABLE HANGER CLIP

(75) Inventor: Richard Korczak, Channahon, IL (US)

(73) Assignee: Andrew LLC, Hickory, NC (US)

( * ) Notice: Subject to any disclaimer, the term of this patent is extended or adjusted under 35 U.S.C. 154(b) by 270 days.

(21) Appl. No.: 12/128,769

(22) Filed: May 29, 2008

(65) Prior Publication Data
US 2009/0294602 A1 Dec. 3, 2009

(51) Int. Cl.
*F16L 3/22* (2006.01)
(52) U.S. Cl. ............ 248/68.1; 248/62; 248/72; 248/63; 248/74.1; 248/71; 248/231.81
(58) Field of Classification Search ............ 248/62, 248/72, 63, 68.1, 74.1, 71, 231.81
See application file for complete search history.

(56) References Cited

U.S. PATENT DOCUMENTS

| | | | | |
|---|---|---|---|---|
| 4,600,174 A * | 7/1986 | Gosse et al. | ........... | 248/72 |
| 4,840,584 A * | 6/1989 | Cox | ........... | 439/538 |
| 5,149,027 A * | 9/1992 | Weber | ........... | 248/68.1 |
| 6,161,804 A | 12/2000 | Paske et al. | | |
| 6,354,543 B1 | 3/2002 | Paske | | |
| 6,715,719 B2 * | 4/2004 | Nault et al. | ........... | 248/68.1 |
| 6,899,305 B2 * | 5/2005 | Korczak et al. | ........... | 248/68.1 |
| 7,484,698 B2 * | 2/2009 | Budagher | ........... | 248/68.1 |
| 2006/0249633 A1 * | 11/2006 | Korczak et al. | ........... | 248/62 |
| 2006/0249634 A1 * | 11/2006 | Van Walraven | ........... | 248/71 |

* cited by examiner

Primary Examiner — Nkeisha J Smith
(74) *Attorney, Agent, or Firm* — Babcock IP, PLLC (57) ABSTRACT

A clip for a snap-in cable hanger with a top from which at least two clip arm(s) extend and at least one of the clip arm(s) formed with a clip tab projecting proximate a distal end. The top having a length greater than a diameter of the mounting hole and a width dimensioned to fit within a spring space when the snap-in cable hanger is seated upon the mounting hole. The clip arm(s) spaced apart proximate the diameter of the mounting hole, having a length longer than a depth of the mounting hole.

17 Claims, 9 Drawing Sheets

SNAP-IN CABLE HANGER CLIP

BACKGROUND OF INVENTION

1. Field of the Invention

This invention relates generally to devices for supporting cables and, in particular, to a clip for improving the strength characteristics of snap-in cable hangers for securing cables to support structures.

2. Description of Related Art

Cable hangers are used to secure signal cables and or transmission lines to support structures. Antenna towers and or tunnels may be crowded due to the multiplicity of signal cables and or transmission lines required for signal-carrying. Over time, as systems are added, upgraded and or expanded, installation of additional signal cables and transmission lines may be required. To conserve space, it is desirable for each set of cable hangers to secure more than a single cable. Certain cable hangers have been constructed to secure multiple cables; other cable hangers have a stackable construction that permits multiple cable hangers to be interlocked extending outwardly from each mounting point/structural member. Stacked and multiple-cable-type cable hangers significantly increase the number of cables mountable to a single attachment point.

U.S. Utility Pat. No. 6,161,804, "Transmission Line Hanger", by Paske et al, issued Dec. 19, 2000 and U.S. Utility Pat. No. 6,354,543, "Stackable Transmission Line Hanger", by Paske, issued Mar. 12, 2002, both patents commonly owned along with the present application by CommScope, Inc. of North Carolina, each patent hereby incorporated by reference in the entirety, disclose transmission line hangers for securing one or more transmission lines to a supporting structure.

The transmission line hangers of U.S. Pat. No. 6,161,804 and U.S. Pat. No. 6,354,543 are configured for snap-in attachment to a mounting hole of the desired supporting structure. Snap-in connection significantly simplifies cable hanger installation.

Increasing demand for additional signal cables and transmission lines at existing system installations has resulted in an increased demand for extended stacking of the U.S. Pat. No. 6,354,543 Snap-In cable hangers, one upon the other, which has the potential to generate loads upon the base connection with the support structure and or interconnections between individual cable hangers that may exceed the capacity of the Snap-In interconnection.

Competition within the cable hanger market has focused attention on ease of use, reliability, expandability and overall reductions in manufacturing, distribution and installation costs.

Therefore, it is an object of the invention to provide a device that overcomes deficiencies in the prior art.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
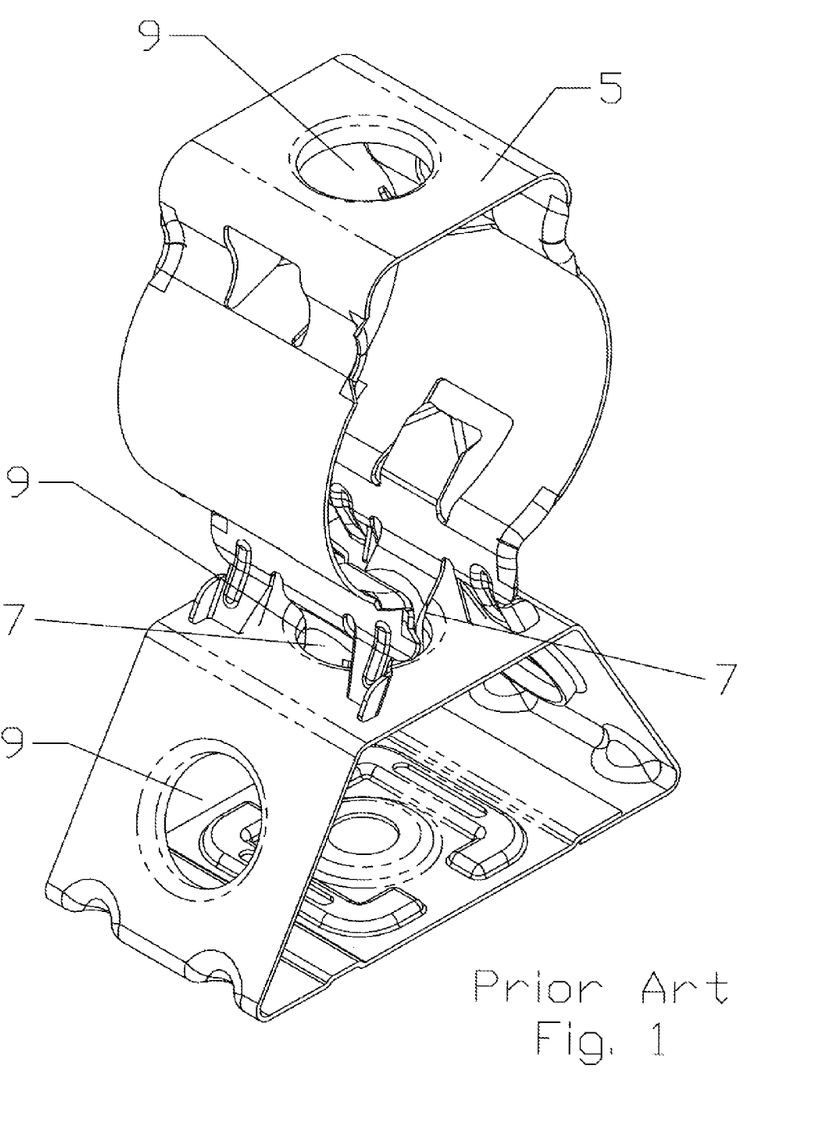
FIG. 1 is a schematic isometric view of an exemplary prior art snap-in cable hanger.

The inventor has analyzed the maximum load and failure characteristics of a snap-in cable hanger 5, for example as shown in FIG. 1. The inventor discovered that a frequent point of failure under excessive load is a twisting and or shift of the leg(s) 7 of the hanger body with respect to the mounting hole which allows retaining features of the legs, such as locking barb(s) 11, to disengage completely and or shift far enough from the seated position to where they can be deformed until they then disengage.

During mounting, the leg(s) 7 of a typical snap-in cable hanger 5 are deflected towards one another into a spring space 13 between the leg(s) 7 to enable clearance of locking barb(s) 11, projecting from a distal end 15 of each leg 7, through the mounting hole 9. Once passed through the mounting hole 9, the leg(s) 7 are allowed to spring back into a mounted configuration where each is biased outwards against the mounting hole 9 sidewall, the locking barb(s) 11 overhanging a bottom of the mounting hole 9, preventing snap-in cable hanger 5 removal.

Figure 2:
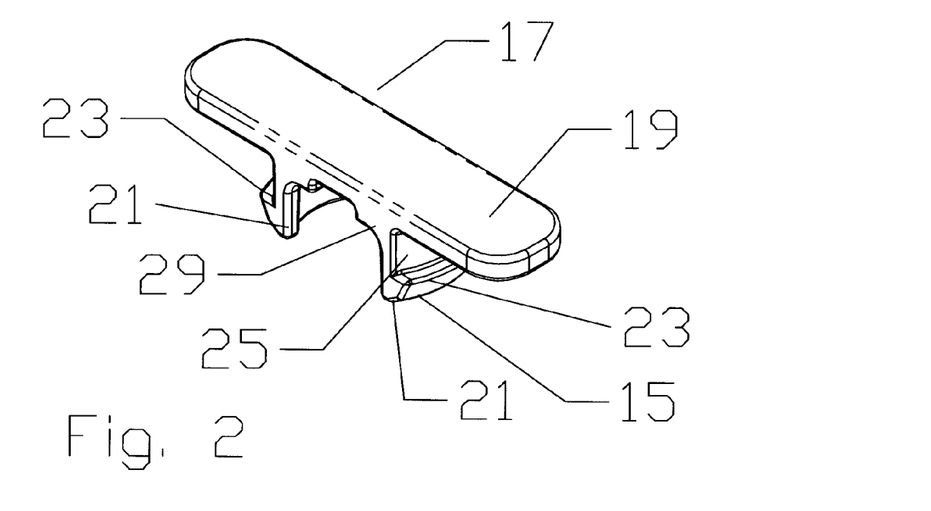
FIG. 2 is a schematic isometric view of a first embodiment of a clip according to embodiments of the present invention.
Figure 3:
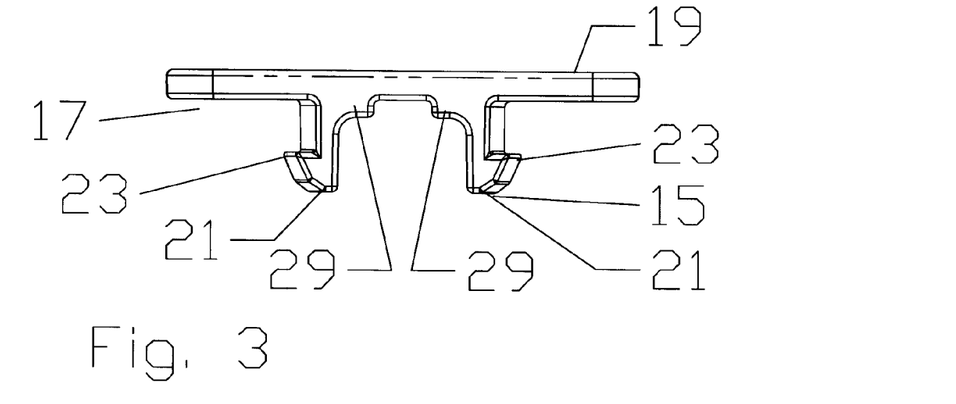
FIG. 3 is a schematic side view of the clip of FIG. 2.
Figure 4:
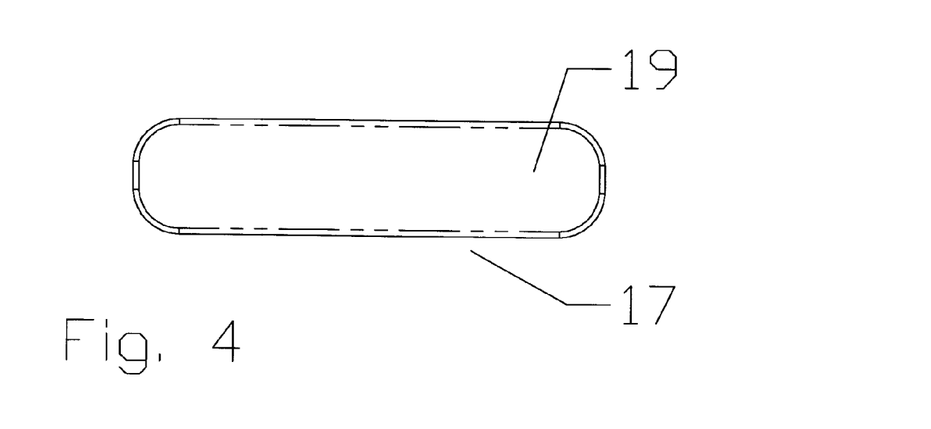
FIG. 4 is a schematic top view of the clip of FIG. 2.
Figure 5:
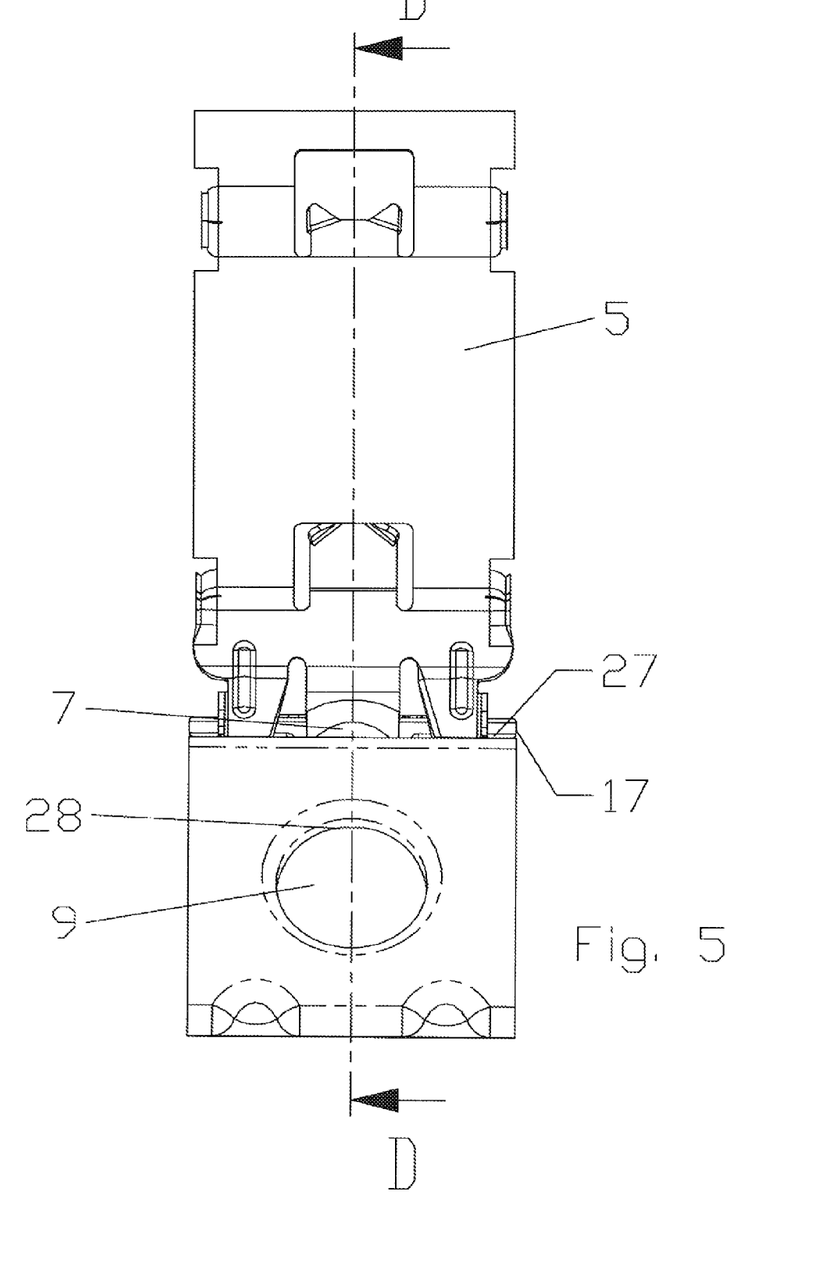
FIG. 5 is a schematic side view of a snap-in cable hanger mounted upon a mounting hole, with a clip installed.
Figure 6:
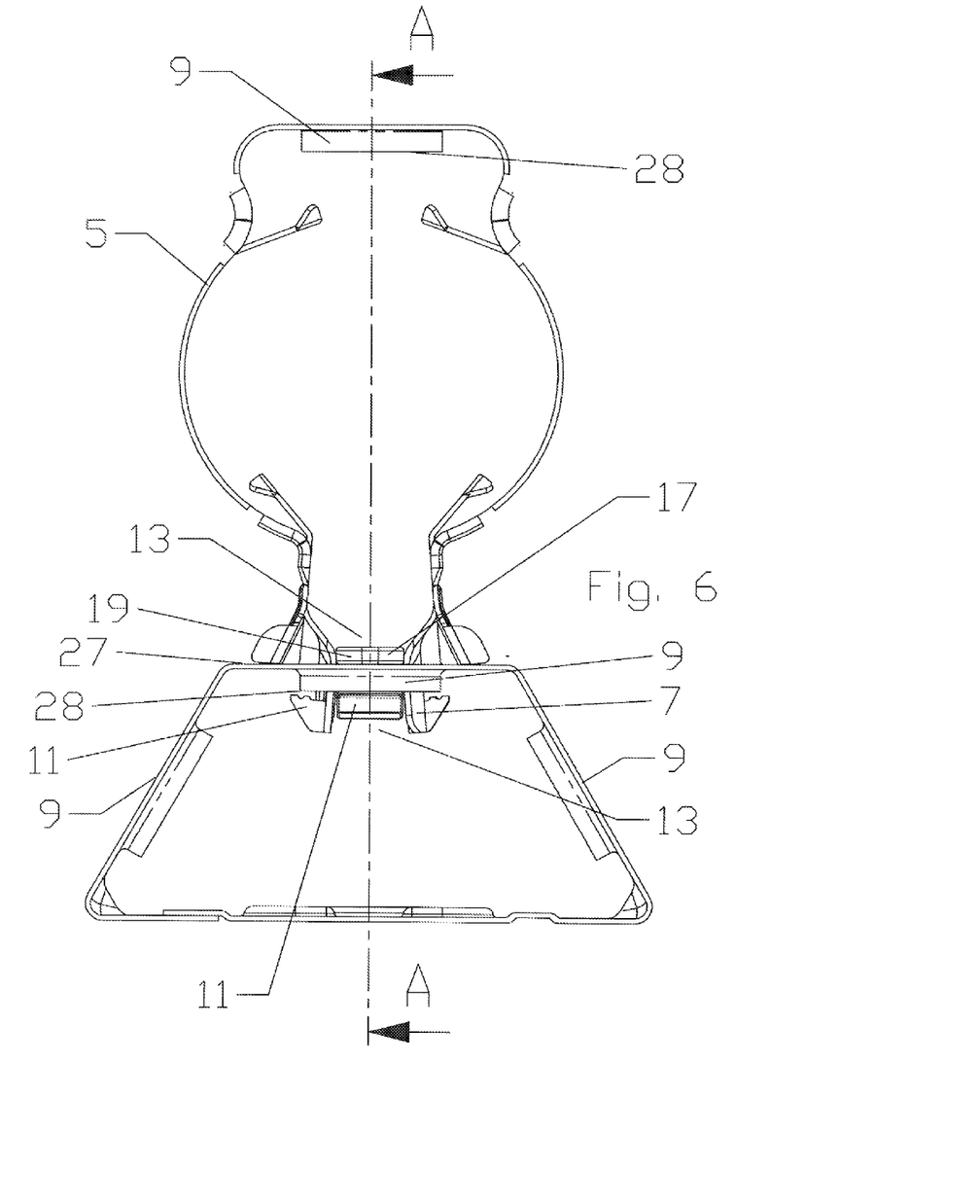
FIG. 6 is a schematic front view of FIG. 5.
Figure 7:
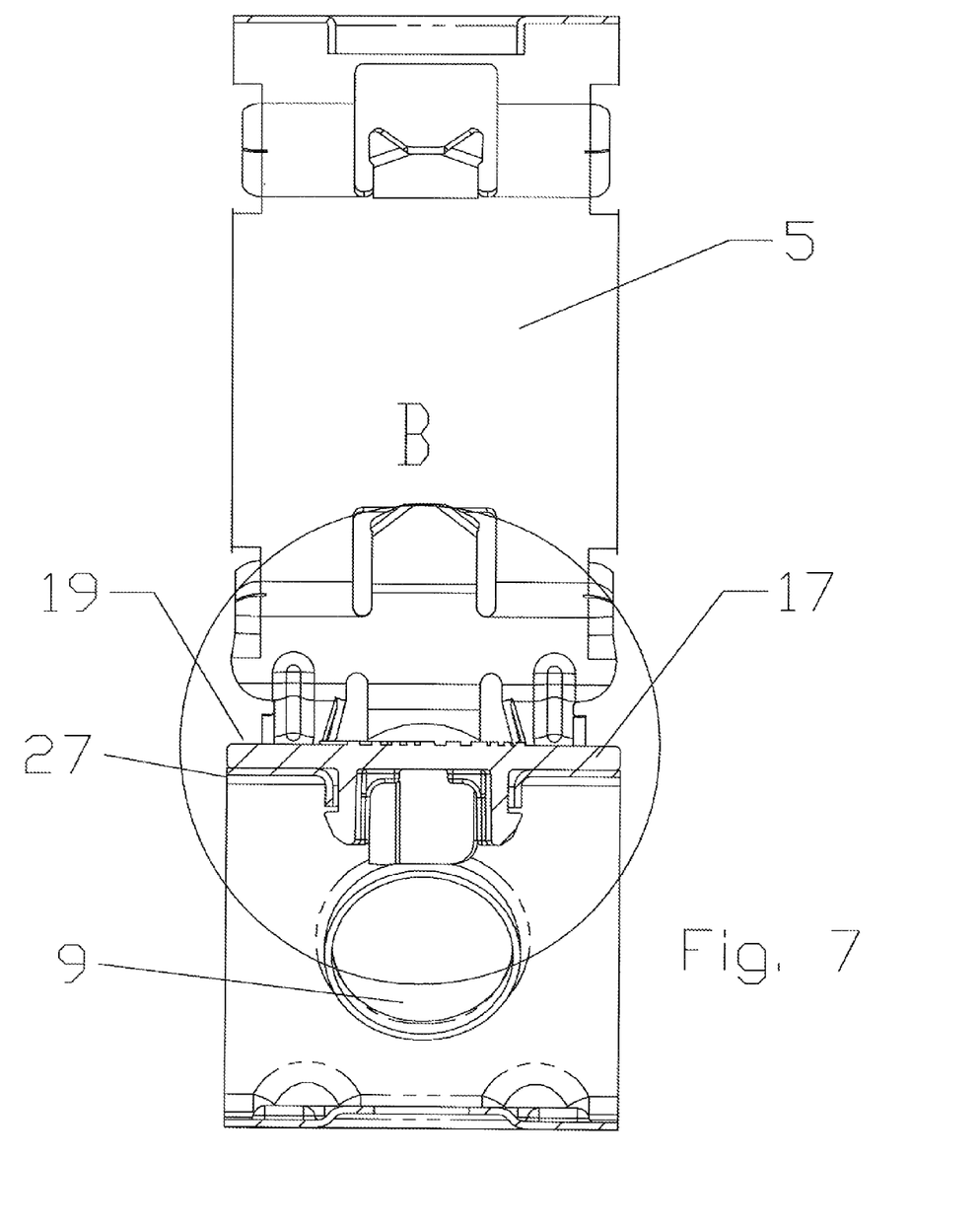
FIG. 7 is a schematic section view along line A-A of FIG. 6.
Figure 8:
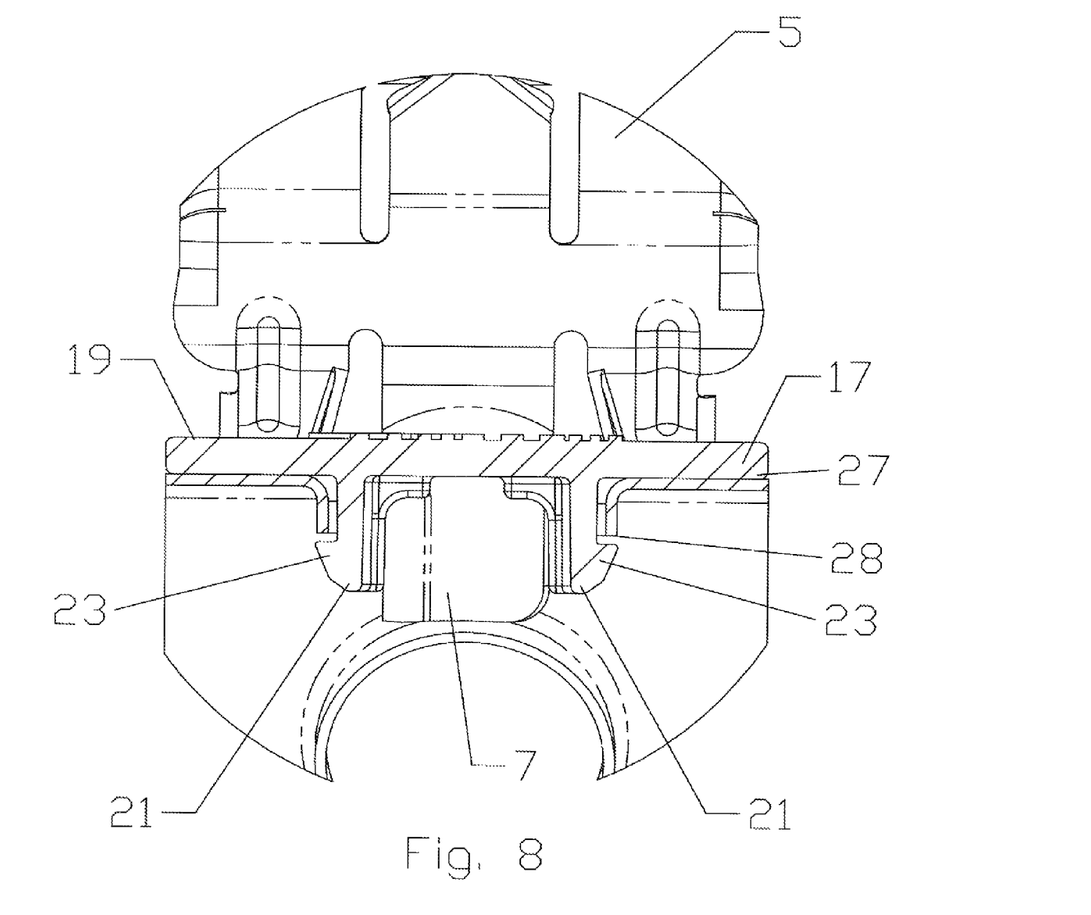
FIG. 8 is a schematic enlarged view of section B of FIG. 7.
Figure 9:
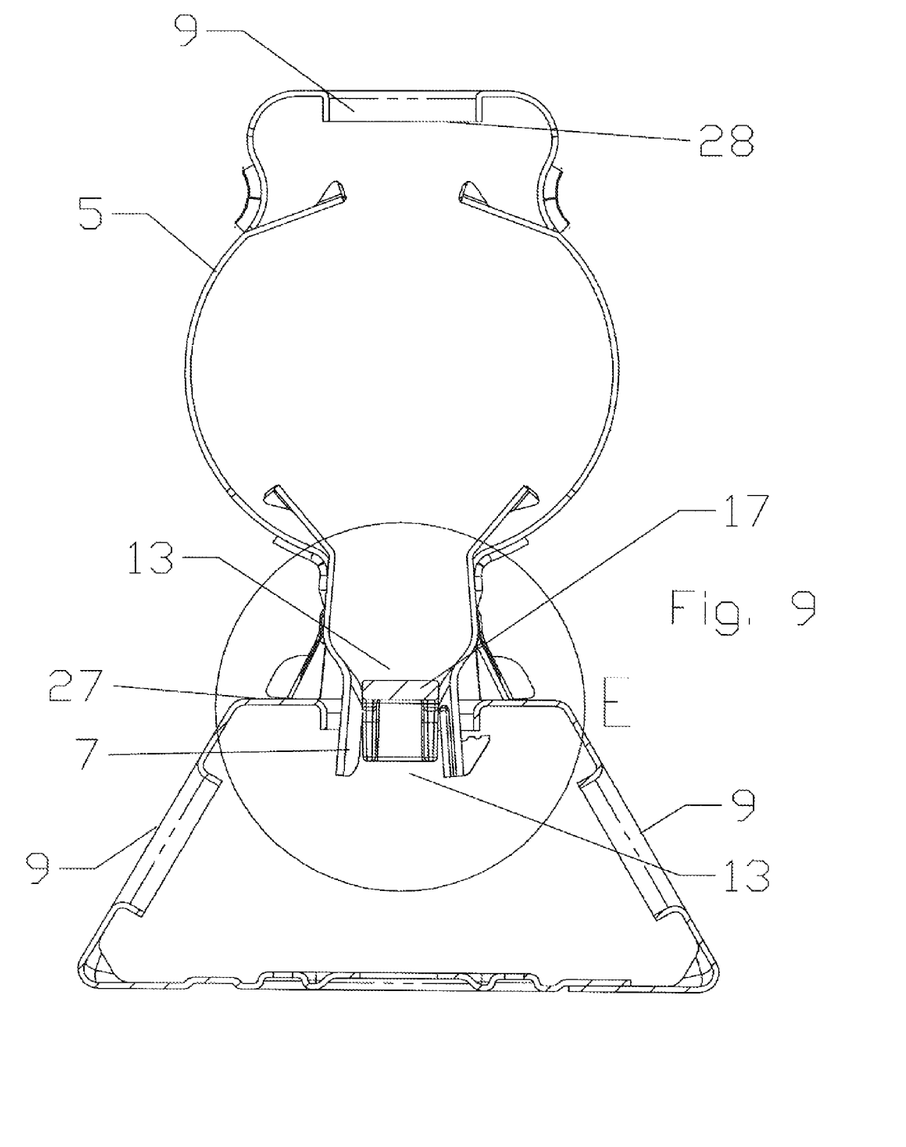
FIG. 9 is a schematic section view along line D-D of FIG. 5.
Figure 10:
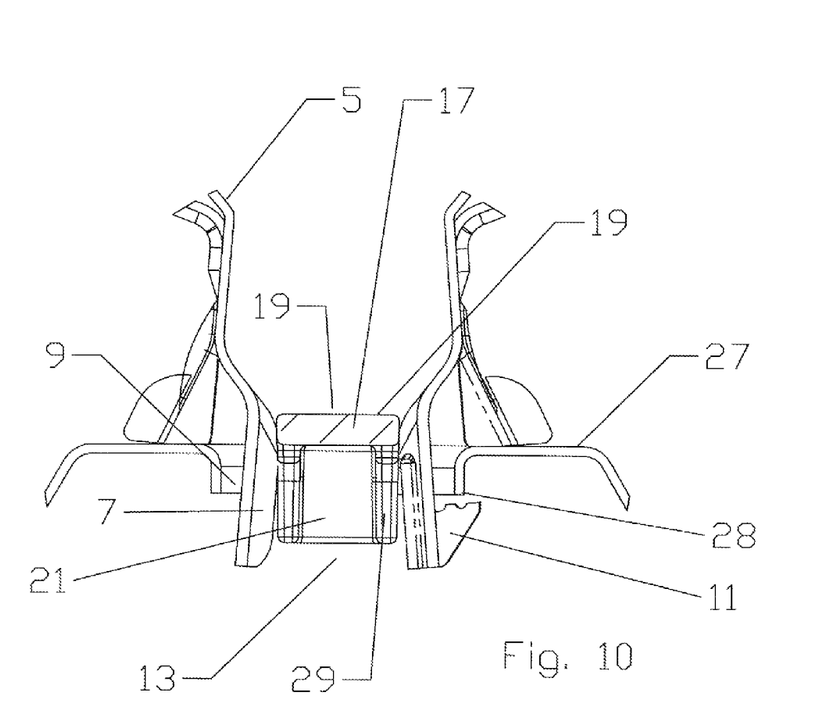
FIG. 10 is a schematic enlarged view of section E of FIG. 9.

As shown in FIGS. 2-4, An exemplary first embodiment of a clip 17, is dimensioned to fit between the leg(s) 7 at the mounting hole 9, filling the spring space 13. When in place, the clip 17 immobilizes each of the leg(s) 7 in the installed position, greatly increasing the maximum load capability of the snap-in cable hanger 5. The clip 17 may formed from, for example, a polymer material such as polyethylene, polycarbonate or polypropylene via injection molding. The polymer material may be selected, for example, to have a balance of cost and mechanical characteristics, for example resistance to deformation and or shattering under pressure and or temperature extremes. Further, the selected polymer material may include ultraviolet radiation degradation resistance characteristics.

The clip 17 has a top 19 from which at least two clip arm(s) 21 extend. At least one of the clip arm(s) 21 may be formed with a clip tab 23 proximate a distal end 15. The clip 17 is dimensioned with respect to the intended snap-in cable hanger 5 and mounting hole 9. The top 19 has a length greater than a diameter of the mounting hole 9. The clip arm(s) 21, spaced apart a distance proximate the mounting hole 9 inner diameter, may have an outer surface 25 formed with a radius of curvature mating with the inner diameter of the mounting hole 9. The clip tab(s) 23 are spaced along the clip arm(s) 21 a distance longer than a depth of the mounting hole 9 such that when the top 19 is seated against the mounting surface 27 that the mounting hole 9 is formed in, the clip tab(s) 23 extend below a bottom edge 28 of the mounting hole 9, clipping against the bottom edge to prevent removal of the clip 17 from the mounting hole 9. The clip arm(s) 21 have a thickness and/or reinforcing shoulder(s) 29 dimensioned with respect to the selected polymer material to have a deflection characteristic enabling the clip arm(s) 21 and clip tab(s) 23 to deflect inward enough to pass through the mounting hole 9 before returning to a static position with the clip tab(s) 23 overhanging the bottom edge of the mounting hole 9, retaining the clip 17 in position.

As demonstrated in FIGS. 5-10, the top 19 has a width dimension selected to fill the spring space 13 between the leg(s) 7 of the snap-in cable hanger when seated in the mounting hole, thereby immobilizing the leg(s) 7 when the clip 17 is inserted. One skilled in the art will appreciate that the clip 17 may be similarly applied to the mounting hole 9 interconnection between snap-in cable hanger(s) 5 applied in a piggy back snap-in cable hanger 5 upon snap-in cable hanger 5 interconnection.

Figure 11:
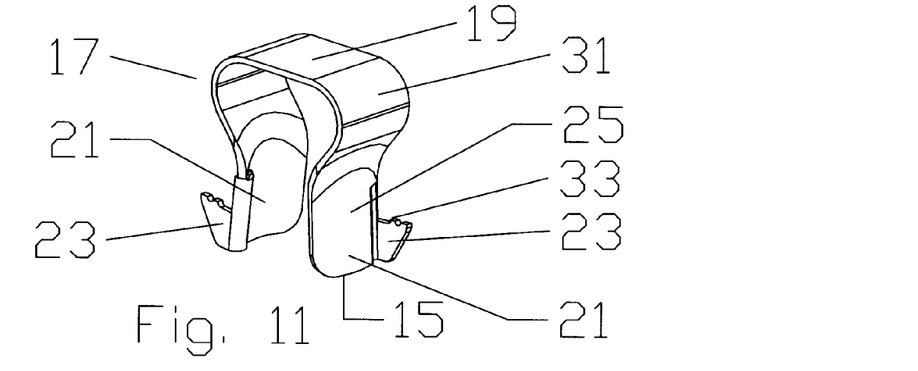
FIG. 11 is a schematic isometric view of a second embodiment of a clip.
Figure 12:
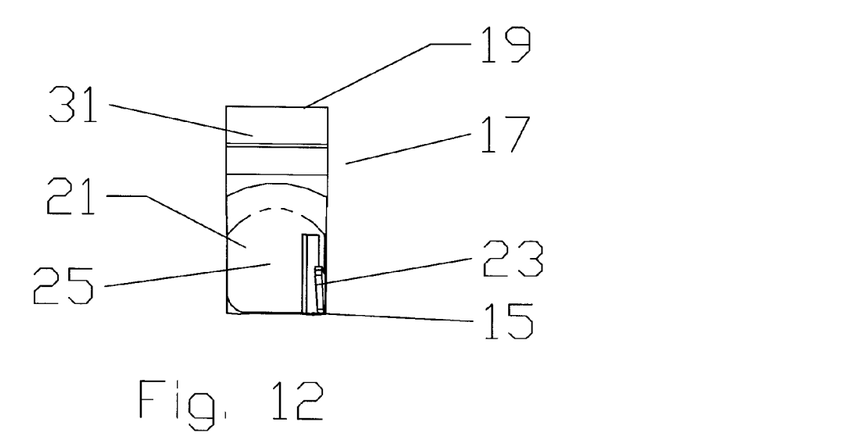
FIG. 12 is a schematic front view of FIG. 11.
Figure 13:
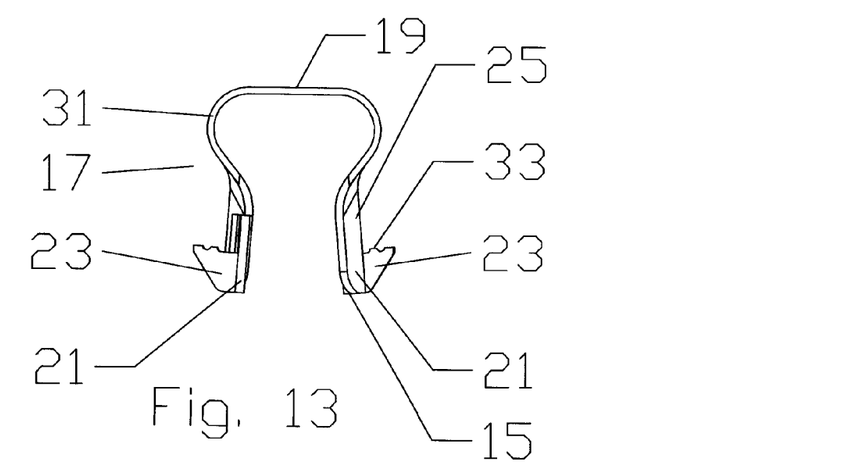
FIG. 13 is a schematic side view of FIG. 11.

Alternatively, the clip 17 may be formed from metal material, for example coated or uncoated sheet metal material similar to that applied to form the snap-in cable hanger(s) 5, as shown for example in FIGS. 11-13. Similar dimensional requirements to those described herein above with respect to the polymer material clip 17 embodiment are applied. However, where a folded and/or bent sheet material construction is desired, the dimensional sizes of features such as the clip tab(s) 23 may be extended to provide acceptable strength characteristics and the top 19 formed for example as an elongated loop 31 to provide overhanging surfaces with respect to seating upon the mounting hole 9 and an outward bias to the clip arm(s) 21. Further, the clip tab(s) 23 may be formed with upward projecting protrusion(s) 33 to form a locking engagement with the bottom edge of the mounting hole.

To minimize the chance of misplacing the clip 17 prior to installation, the clip 17 may be removably coupled to the snap-in hanger 5 as delivered to the installer, for example via a string, wire, tape or glue.

Failure testing of snap-in cable hanger(s) 5 installed with and without a clip 17 according to the invention has demonstrated a dramatic improvement in the load capabilities of the snap-in cable hanger(s) 5 when the clip 17 is present. One skilled in the art will recognize that the minimal additional cost of the clip 17 greatly improves the performance of the snap-in cable hanger(s) 5, without requiring extensive reinforcement and or redesign of the snap-in cable hanger(s) 5, themselves.

Although the clip 17 has been demonstrated with respect to a specific snap-in cable hanger 5 configuration, one skilled in the art will appreciate that the clip 17 may be applied according to the invention to any cable hanger configuration based upon snap-in attachment to a mounting hole 9 by deflection of leg(s) 7 or other retaining features into a spring space 13 that the clip 17 is then dimensioned to fill, preventing twisting or bending forces from biasing the leg(s) 7 or other retaining features back into the spring space 13 where disconnection and or weakening of the retention capabilities of the cable hanger can occur.

From the foregoing, it will be apparent that the present invention brings to the art a significant improvement to snap-in cable hanger(s) 5 while maintaining their well known ease of installation and manufacturing efficiencies.

| Table of Parts | |
|---|---|
| 5 | snap-in cable hanger |
| 7 | leg |
| 9 | mounting hole |
| 11 | locking barb |
| 13 | spring space |
| 15 | distal end |
| 17 | clip |
| 19 | top |
| 21 | clip arm |
| 23 | clip tab |
| 25 | outer surface |
| 27 | mounting surface |
| 28 | bottom edge |
| 29 | shoulder |
| 31 | elongated loop |
| 33 | protrusion |

Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A clip in combination with a snap-in cable hanger for mounting upon a mounting hole comprising: the snap-in cable hanger comprising a pair of legs, each leg provided with a retaining feature; the legs dimensioned to pass through the mounting hole while deflected towards one another into a spring space; the retaining feature dimensioned to retain the snap-in cable hanger upon the mounting hole while the legs are outside the spring space; the clip comprising a top from which at least two clip arm(s) extend; at least one of the clip arm(s) formed with a clip tab projecting proximate a distal end; the clip arm(s) spaced apart proximate a diameter of the mounting hole, having a length longer than a depth of the mounting hole, for attachment to the mounting hole; the top having a width dimensioned to fit within the spring space when the snap-in cable hanger is seated upon the mounting hole, whereby insertion of the clip between the legs into the mounting hole at the spring space prevents removal of the snap-in hanger from the mounting hole.

2. The combination of claim 1, wherein the clip arm(s) have a radius of curvature on an outer surface that mates with the inner diameter of the mounting hole.

3. The combination of claim 1, wherein the clip arm(s) have a deflection characteristic whereby the clip arm(s) are deflectable toward each other to pass the clip tab(s) through the mounting hole.

4. The combination of claim 1, wherein the clip arm(s) have reinforcing shoulder(s).

5. The combination of claim 1, wherein the clip is a monolithic portion of a polymer material.

6. The combination of claim 1, wherein the clip is a monolithic portion of sheet metal.

7. The combination of claim 6, wherein the top is an elongated loop which biases the clip arm(s) outward.

8. The combination of claim 6, wherein the clip tab(s) have at least one upward projecting protrusion.

9. The combination of claim 1, wherein the clip is removably coupled to the snap-in cable hanger.

10. The combination of claim 1, wherein a length of the top is greater than a diameter of the mounting hole.

11. A clip in combination with a snap-in cable hanger for mounting upon a mounting hole comprising: the snap-in cable hanger comprising a pair of legs, each leg provided with a retaining feature; the legs dimensioned to pass through the mounting hole while deflected towards one another into a spring space; the retaining feature dimensioned to retain the snap-in cable hanger upon the mounting hole while the legs are outside the spring space; and the clip comprising a top from which at least two clip arm(s) extend; at least one of the clip arm(s) formed with a clip tab projecting proximate a distal end; the clip arm(s) provided with a radius of curvature on an outer surface that mates with an inner diameter of the mounting hole; the clip arm(s) provided with a deflection characteristic whereby the clip arm(s) are deflectable toward each other to pass the clip tab(s) through the mounting hole the clip arm(s) spaced apart proximate a diameter of the mounting hole, having a length longer than a depth of the mounting hole, for attachment to the mounting hole; the top having a width dimensioned to fit within the spring space when the snap-in cable hanger is seated upon the mounting hole, whereby insertion of the clip between the legs into the mounting hole at the spring space prevents removal of the snap-in hanger from the mounting hole.

12. The combination of claim 11, wherein the clip arm(s) have reinforcing shoulder(s).

13. The combination of claim 11, wherein the clip is a monolithic portion of a polymer material.

14. The combination of claim 11, wherein the clip is a monolithic portion of sheet metal.

15. The combination of claim 14, wherein the top is an elongated loop which biases the clip arm(s) outward.

16. The combination of claim 14, wherein the clip tab(s) have at least one upward projecting protrusion.

17. The combination of claim 11, wherein a length of the top is greater than a diameter of the mounting hole.

* * * * *